| 
US008770622B2

(12) United States Patent
Donais et al.

(10) Patent No.: US 8,770,622 B2
(45) Date of Patent: Jul. 8, 2014

(54) AIRBAG FOR A VEHICLE

(75) Inventors: Mark Donais, Tilbury (CA); Bryan Walston, Perry, UT (US); Ugo Zanier, Essex (CA); Pamela Knight, Tilbury (CA)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/878,730

(22) PCT Filed: Sep. 2, 2011

(86) PCT No.: PCT/SE2011/051056
§ 371 (c)(1),
(2), (4) Date: Apr. 10, 2013

(87) PCT Pub. No.: WO2012/050504
PCT Pub. Date: Apr. 19, 2012

(65) Prior Publication Data
US 2013/0187368 A1  Jul. 25, 2013

(30) Foreign Application Priority Data
Oct. 13, 2010 (DE) .......................... 10 2010 048 164

(51) Int. Cl.
*B60R 21/23* (2006.01)
*B60R 21/235* (2006.01)
*B60R 21/231* (2011.01)
*B60R 21/232* (2011.01)
*B60R 21/213* (2011.01)

(52) U.S. Cl.
CPC ............... *B60R 21/23* (2013.01); *B60R 21/235* (2013.01); *B60R 21/232* (2013.01); *B60R 2021/23547* (2013.01); *B60R 21/231* (2013.01); *B60R 21/213* (2013.01)

USPC .................. 280/743.1; 280/728.2; 280/730.2

(58) Field of Classification Search
CPC .... B60R 21/235; B60R 21/23; B60R 21/232; B60R 2021/23547; B60R 21/231; B60R 21/213
USPC ................................. 280/743.1, 730.2, 728.2
See application file for complete search history.

(56) References Cited

U.S. PATENT DOCUMENTS 1,949,579 A   3/1934  Parker
4,766,301 A   8/1988  Evers
(Continued)

FOREIGN PATENT DOCUMENTS

DE   4236783 A1    5/1993
EP   0328320 A1 *  8/1989  ............ D03D 15/00
(Continued)

OTHER PUBLICATIONS

International Search Report and Written Opinion of the ISA for PCT/SE2011/051056, ISA/SE, Stockholm, mailed Dec. 22, 2011.

*Primary Examiner* — Paul N Dickson
*Assistant Examiner* — Joselynn Y Sliteris
(74) *Attorney, Agent, or Firm* — Harness, Dickey & Pierce, P.L.C.

(57) ABSTRACT

An airbag for a vehicle comprising an inflatable portion and lugs arranged at the periphery of the inflatable portion. The airbag is made of a one-piece-woven technology having a structure made of warp threads and weft threads. The airbag further comprises a marking for enabling a detection of an incorrect attachment of the airbag at the vehicle. The marking is realized by a coded weaving structure in at least one lug.

9 Claims, 5 Drawing Sheets

(56) References Cited

U.S. PATENT DOCUMENTS

Figure 1:
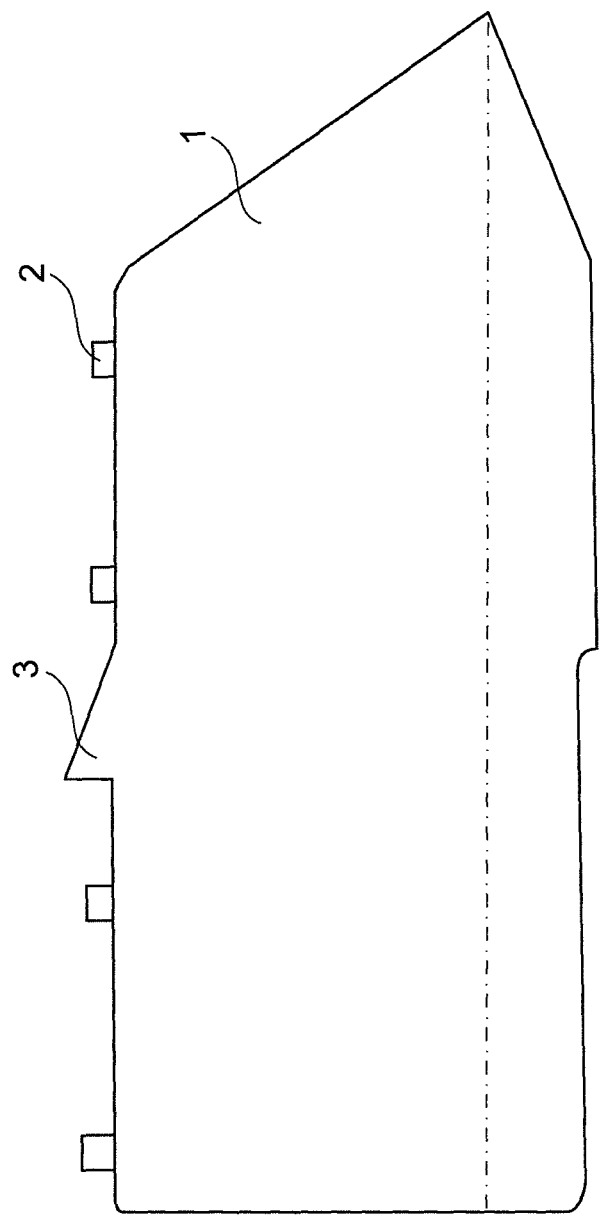

| | | | |
|---|---|---|---|
| 5,186,489 A * | 2/1993 | Imai | 280/728.2 |
| 5,613,708 A * | 3/1997 | Bleider et al. | 280/743.2 |
| 6,386,584 B1 * | 5/2002 | Bowser | 280/743.1 |
| 6,616,179 B2 | 9/2003 | Tanase et al. | |
| 7,159,896 B2 | 1/2007 | Ochiai et al. | |
| 7,635,144 B2 * | 12/2009 | Kim et al. | 280/728.1 |
| 7,681,602 B2 * | 3/2010 | Youn et al. | 139/383 R |
| 7,766,369 B2 | 8/2010 | Bradburn et al. | |
| 2002/0020991 A1 | 2/2002 | Tanase et al. | |
| 2004/0201207 A1 | 10/2004 | Ochiai et al. | |
| 2008/0252046 A1 | 10/2008 | Bradburn et al. | |
| 2010/0035499 A1 | 2/2010 | Kismir et al. | |
| 2010/0173137 A1 | 7/2010 | Kismir et al. | |
| 2014/0021705 A1 * | 1/2014 | Youn et al. | 280/730.1 |

FOREIGN PATENT DOCUMENTS

| | | | |
|---|---|---|---|
| EP | 0919650 A1 * | 6/1999 | D03D 1/00 |
| EP | 1978430 A1 | 10/2008 | |
| GB | 2410725 A | 8/2005 | |
| JP | H 07-26261 U | 5/1995 | |
| WO | 2008/105693 A1 | 9/2008 | |
| WO | 2008/143557 A | 11/2008 | |

* cited by examiner

AIRBAG FOR A VEHICLE

CROSS-REFERENCE TO RELATED APPLICATIONS

This application is a 371 U.S. National Stage of International Application No. PCT/SE2011/051056, filed Sep. 2, 2011, which application claims priority to German Patent Application No. 102010048164.5, filed Oct. 13, 2010. The disclosures of the above applications are entirely incorporated by reference herein.

The invention relates to an airbag for a vehicle.

Airbags are used in different areas of the interior structure of the vehicle, like for example in the steering wheels, dashboard, at the roof structure or in the seat structure.

The purpose of the airbag is to protect the occupant in a crash and to prevent severe injuries. Especially in big airbags, like for example in curtain airbags, several attachment points are needed to mount the airbag in the vehicle. Because of these several attachment points it may occur that the airbag is not mounted properly and will thereby not be inflated when actuated like intended.

From the EP 1 978 430 A1 it is known to provide the airbag with an indicator, which may be designed as a number of parallel lines or other marks at the outer visible surface of a curtain airbag. Furthermore, it is provided a failure detection device comprising a camera sensor system which detects a failure mounting when the course of the parallel lines does not comply with a predetermined orientation or when the marks are not at a predetermined position.

Because the indicator is designed as a separate part, there is a risk that the indicator is mounted incorrectly and furthermore the indicator needs to be mounted in a separate assembly step during the manufacture of the airbag.

From the WO 2008/143557 A1 it is known to provide the fabric of the airbag with markings which may comprise different weaving patterns for example utilising differently coloured yarns. These markings may contain information like a date or reference positions, on the basis of which the automatic cutting equipment establishes, where the fabric should be cut.

The markings are not designed to prevent an incorrect mounting of the airbag at the structure of the vehicle. This is especially not possible as the markings are not designed or located to be visible at the airbag after the rolling or folding process.

Therefore, it is the object of the invention to provide an airbag with a marking to prevent incorrect mounting at the vehicle structure, which does not increase the manufacturing costs and effort. Furthermore, the marking should be uncovered for a failure detection device.

According to the invention, it is suggested that the marking is realised by a coded weaving structure in at least one lug. The advantage of the suggested airbag is that the marking is integrated in the fabric and can therefore be manufactured in the weaving process without any further production or assembly step. As there is no further assembly or separate indicator needed the manufacturing costs are thereby reduced. Furthermore, the marking is located in the lug which is not rolled or folded with the inflatable portion, so that the marking is freely accessible after the rolling or folding for a verification.

Furthermore, it is suggested that at least a few warp and weft threads in the lug are coloured differently. The different colour of the warp and weft threads improves the detectability of the marking especially when an optical sensor device is used to detect the incorrect attachment.

Preferably black and white are used as different colours, so that the marking is very distinctive.

Furthermore, it is suggested that the coded weaving structure provides a two dimensional bar code. The marking may therefore be provided with even more information. The two dimensional bar code consists of several bunches of weft threads having a different weaving structure, wherein each bunch of weft threads represents one coded information provided by the individual weaving structure.

Another preferred embodiment of the invention can be seen in that the coded weaving structure is visible from both sides of the lug, and that the marking at the back side is different from the marking at the front side. The advantage of having different markings at the back and front side is that in case of an incorrect attachment it is also possible to sense a marking but with a different characteristic. Thereby it is possible to sense an incorrect attachment unambiguously and it is excluded that a failure of the sensing device would result in an incorrect detection of a failure attachment.

These different markings on both sides might be realised by inverting the marking from the front side at the back side for example by using a single layer lug.

The marking may further comprise additional information about the individual airbag, like a lot number, part number, product name or production plant and date.

Furthermore, it is suggested, that the coded weaving structure comprises weft threads with different colours. The advantage in using weft threads with different colours can be seen in that the coded weaving structure got an optical appearance, which can be much easier detected by the handling person or a detection device. The preferred colours are black and white to provide a clearly distinguishable code.

The code can be distinguished even better from other codes, when the weft threads with the different colours are weaved differently with the warp threads. The weft threads with the different colours can create a pattern, which is preferably a two dimensional bar code, wherein each weft thread or bunch of weft threads having the same colour and weaving structure in one string can contain one information.

Figure 2:
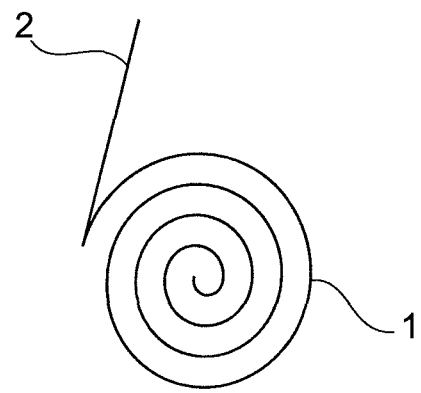
Figure 3:
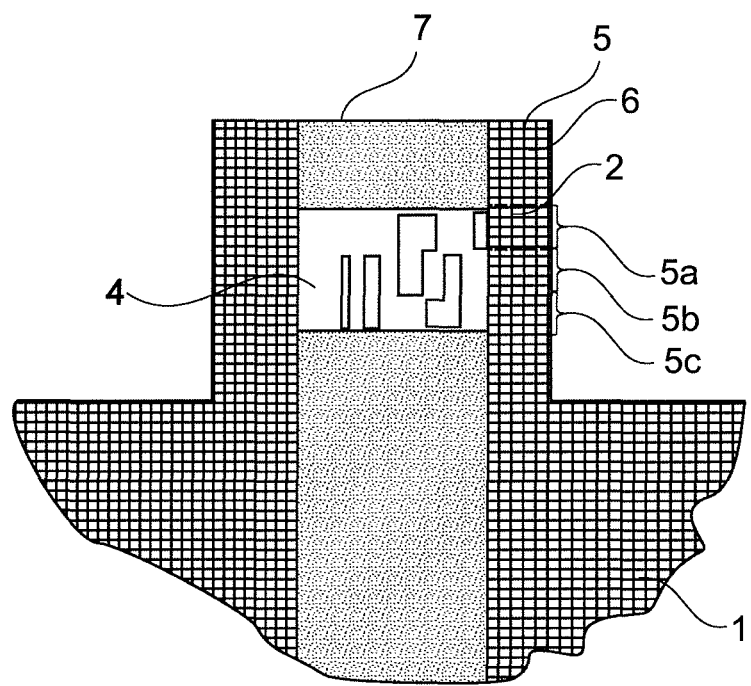
Figure 4:
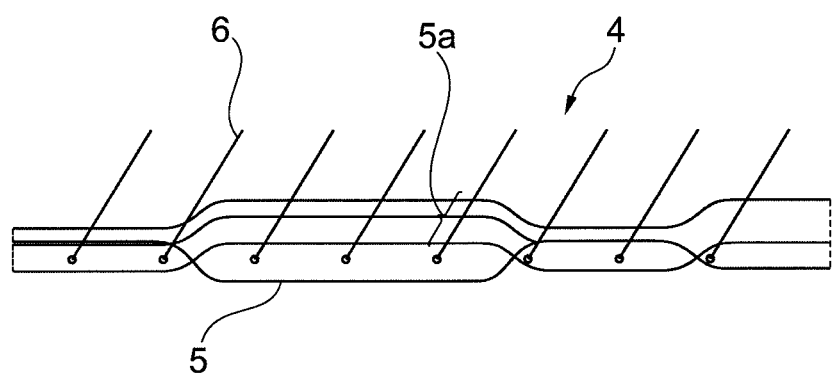
Figure 5:
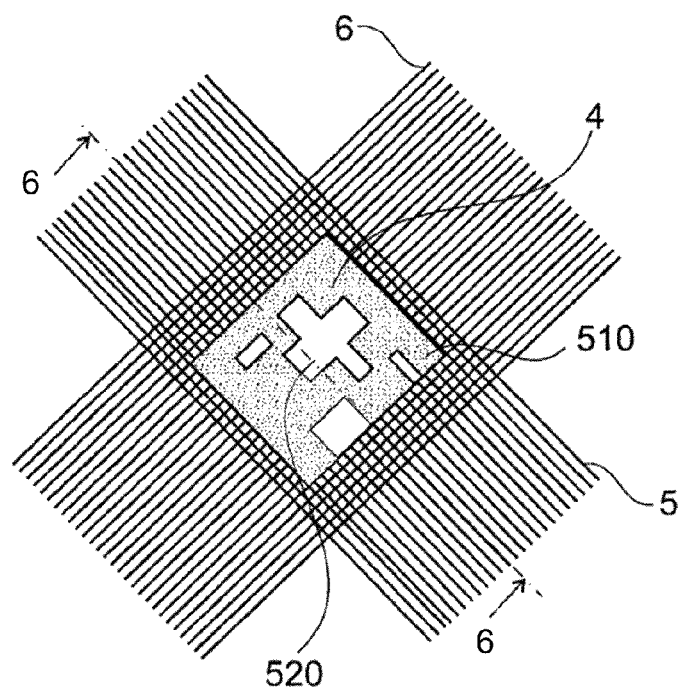
Figure 6:
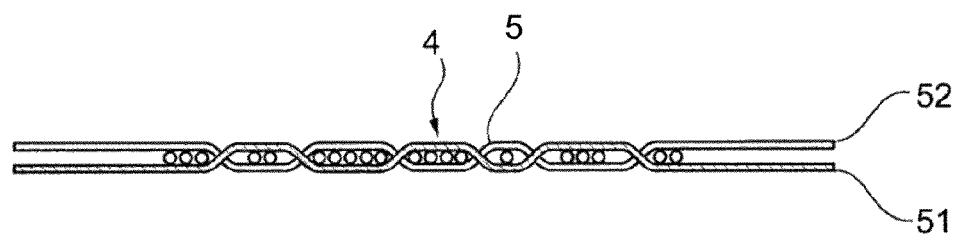

In the following, the invention is described based on a preferred embodiment, wherein the figures show:

FIG. 1: is a curtain airbag in accordance with the present teachings before the rolling or folding process;

FIG. 2: is a cross-sectional view of the curtain airbag from FIG. 1 after the rolling or folding process;

FIG. 3: is the curtain airbag with a lug comprising an inventive marking;

FIG. 4: is an enlarged view of warp and weft threads of the marking with a coded weaving structure;

FIG. 5: is a top view of the coded weaving structure with weft threads with different colours;

FIG. 6 is a cross-sectional view taken along the line of 6-6 of FIG. 5.

Figure 7:
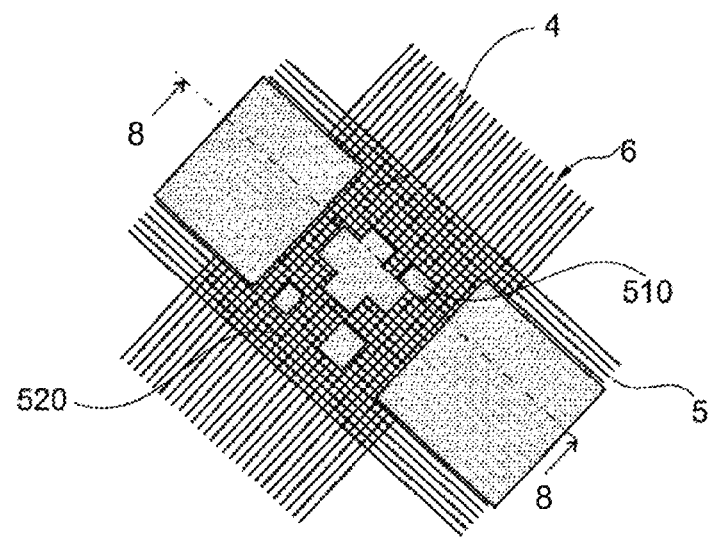
Figure 8:
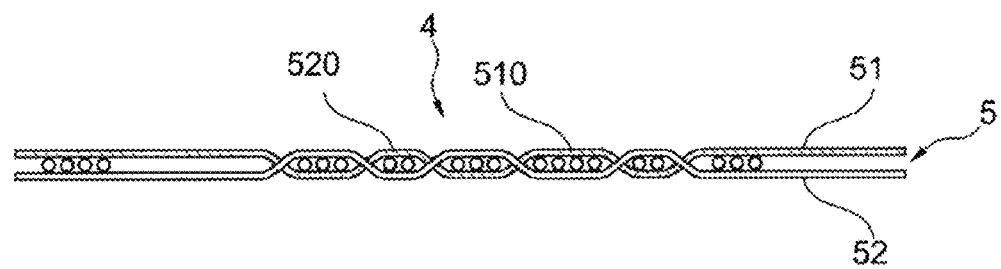

FIG. 7: is a bottom view of the coded weaving structure with weft threads with different colours in view; and FIG. 8 is a cross-sectional view taken along the line 8-8 of FIG. 7.

In FIG. 1 it is shown an airbag for the interior side protection, also called curtain airbag, with an inflatable portion 1, several lugs 2 arranged over the periphery of the inflatable portion 1 and a gas inlet 3, where a not shown gas generator can be adapted. As the curtain airbag needs to cover the interior side structure from the A- to C- or D-pillar, the airbag might have a total length of 2 metres or more.

In FIG. 2 the same airbag is shown after the rolling or folding process, wherein the inflatable portion 1 is rolled or folded to a tube and the lug 2 is extending upwards providing an attachment surface for the attachment of the airbag at the vehicle or a Poke Yoke feature to assure an attachment of the airbag in only one position. The airbag after the rolling has a tubular shape with a length of 2 metres or more. Because of the long tubular shape it is possible that the airbag is mounted in a twisted status, with the result that the airbag cannot be inflated as intended in the crash.

In FIG. 3 it is shown an enlarged view of a cut-out of the airbag with a lug 2 and a part of the inflatable portion 1. The airbag is made of a one-piece-woven (OPW) fabric with warp threads 6 and weft threads 5. The warp and weft threads and are basically in the same colour, preferably in white, with the exception of a strip 7, where the warp threads 6 are black.

In the lug 2 is provided a marking 4 which is realised by a coded weaving structure. The coded weaving structure is also shown in FIG. 4 in an enlarged view. The white weft threads 5 are weaved in a defined structure with a predefined irregular number of weft threads 5 undergoing and overlapping the warp threads 6. Furthermore, several adjacent weft threads 5 are grouped together to a bunch 5a with an identical weaving structure. Adjacent to the bunch 5a is arranged another bunch 5b with a weaving structure which is different from the weaving structure of the bunch 5a. The different bunches 5a, 5b and 5c are creating with their individual weaving structure a two dimensional bar code which represents several information like for example product type and number, production plant and date, customer, lot numbers etc. Furthermore, it is possible to trace the product from the production until the attachment into the vehicle.

By using a single layer fabric for the lug 2, the coded weaving structure is automatically visible inverted at the back side of the lug 2, so that an incorrect attachment would show also a marking which might be detected by the detection device. Therefore, a detection device working error-free would sense a marking 4 independently from the fact if the airbag is mounted in the incorrect or in the correct position. By differentiating the different markings at the front side and at the back side it is possible to create a clear signal whether the attachment is correct or not correct. When no marking is sensed, it is a clear indication that either the detection device is not working error-free or the wrong surface was detected by the detection device. In any case the verification needs to be repeated in this case.

In FIGS. 5 through 8 is shown one further preferred embodiment, in which several weft threads 5 comprise different colours and a different weaving structure. As shown in FIGS. 6 and 8 the weft threads can be differentiated in black weft threads 51 and white weft threads 52. The black and white weft threads 51 and 52 are located outside the marking 4 on different sides of the weaving, so that one side got a black appearance and the other side a white appearance. In the section of the marking the weft threads 51 and 52 are weaved differently with the warp threads 6, so that different sections 510 and 520 are created, where either the black weft threads 51 or the white weft threads 52 are visible from one side.

FIGS. 5 and 6 show the white weft threads 52 visible outside the marking 4 and FIGS. 7 and 8 shows the black weft threads 51 visible outside the marking 4 in the shape of a strip having the same width as the marking 4.

The invention claimed is:

1. An airbag for a vehicle comprising:
   an inflatable portion;
   at least one lug arranged at a periphery of the inflatable portion; and
   a marking for enabling a detection of an incorrect attachment of the airbag at the vehicle, the marking being a coded weaving structure in the at least one lug;
   wherein the airbag is made of a one-piece-woven technology having a structure made of warp threads and weft threads.

2. The airbag according to claim 1, wherein at least a few warp threads and at least a few weft threads in the lug are coloured differently from each other.

3. The airbag according to claim 2, wherein the different colours are black and white.

4. The airbag according to claim 2, wherein the coded weaving structure provides a two dimensional bar code.

5. The airbag according to claim 1, wherein the coded weaving structure is visible from both sides of the lug, and that the marking at a back side is different from the marking at a front side.

6. The airbag according to claim 5, wherein the marking at the back side is an inverted marking of the front side.

7. The airbag according to claim 1, wherein the marking contains additional information related to the airbag.

8. The airbag according to claim 1, wherein the coded weaving structure comprises weft threads with different colours.

9. The airbag according to claim 8, wherein the weft threads with the different colours are weaved differently with the warp threads.

* * * * *